(12) United States Patent
Fritschle

(10) Patent No.: US 6,843,745 B2
(45) Date of Patent: Jan. 18, 2005

(54) AUTOMATIC TRANSMISSION

(75) Inventor: Ulrich Fritschle, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/288,626

(22) Filed: Nov. 5, 2002

(65) Prior Publication Data
US 2003/0101835 A1 Jun. 5, 2003

(30) Foreign Application Priority Data

Nov. 30, 2001 (DE) .......................... 101 58 894

(51) Int. Cl.⁷ .................... F16H 31/00; F16D 33/00
(52) U.S. Cl. ...................... 475/116; 192/3.33
(58) Field of Search .................. 74/333; 475/116; 184/6.12; 192/3.33, 3.29, 87.13, 87.18, 110 S

(56) References Cited

U.S. PATENT DOCUMENTS

| | | | | |
|---|---|---|---|---|
| 2,156,041 A | * | 4/1939 | Duffield ................... 475/58 |
| 2,936,864 A | * | 5/1960 | Schjolin et al. ............ 475/68 |
| 3,126,079 A | * | 3/1964 | Howard ................... 192/3.33 |
| 3,613,481 A | * | 10/1971 | Lapinski ................. 475/116 |
| 3,776,066 A | | 12/1973 | Piret ....................... 74/763 |
| 3,929,211 A | * | 12/1975 | Maddock ............... 192/3.33 |
| 4,148,229 A | * | 4/1979 | Kuramochi et al. ...... 184/6.12 |
| 4,203,331 A | * | 5/1980 | Shindo et al. ............ 475/159 |
| 4,949,683 A | | 8/1990 | Swars ................... 123/90.34 |
| 5,199,317 A | * | 4/1993 | Moore et al. ........... 184/6.12 |
| 6,044,931 A | | 4/2000 | Reed, Jr. et al. ........ 184/6.12 |

FOREIGN PATENT DOCUMENTS

| | | | | |
|---|---|---|---|---|
| DE | 38 03 685 C2 | 8/1991 | ........... F16H/53/02 |
| DE | 197 34 839 A1 | 2/1999 | ........... F16H/63/30 |
| DE | 199 08 840 A1 | 9/2000 | ........... F16H/57/04 |
| JP | 404357349 A | * 12/1992 | ................ 74/333 |

* cited by examiner

Primary Examiner—Roger Pang
(74) Attorney, Agent, or Firm—Davis & Bujold, P.L.L.C.

(57) ABSTRACT

An automatic transmission for vehicles is equipped with a housing in which a number of clutches and brakes, as well as an input shaft and an output shaft and at least one torque-controlling shaft (1), are positioned. The torque-controlling shaft (1) is equipped with neither a lengthwise bore for the central supply of fluid to the clutches or brakes, nor cross bores and grooves.

13 Claims, 3 Drawing Sheets

AUTOMATIC TRANSMISSION

FIELD OF THE INVENTION

Figure 1:
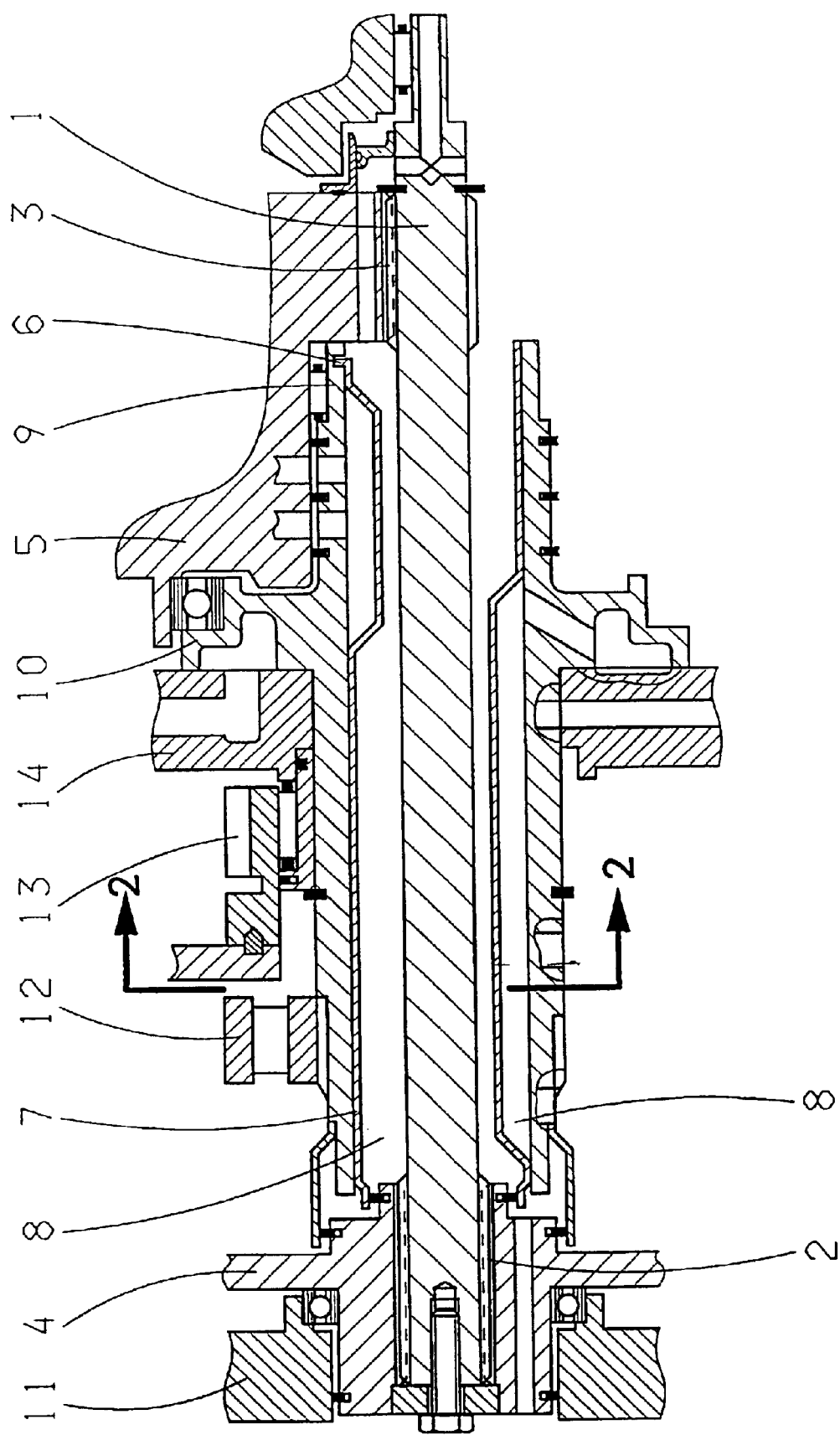

The invention relates to an automatic transmission.

BACKGROUND OF THE INVENTION

Torque-controlling shafts equipped with cross bores and grooves are used both in continuously variable automatic transmissions and in multi-stage automatic transmissions to supply hydraulic fluid to individual components of the transmission, such as torque converters and shifting components, wherein the cross bores are ordinarily designed as cylindrical bores having a transfer radius at the outlet point.

One example of this type of multi-stage automatic transmission is described by the applicant in DE 199 08 840. In this case, the multi-stage automatic transmission is equipped with a number of clutches and brakes. A torque-controlling sleeve shaft feeds coolant to a clutch, discharging it through the radial cross bores in the torque-controlling shaft. The torque-controlling shaft is also equipped with grooves for various gaskets.

An example of a continuously variable automatic transmission having a multi-plate clutch is described by the applicant in DE 197 34 839 A1. In this case as well, a primary shaft, designed as a torque-controlling shaft, is provided with cross bores for the introduction of fluid for lubrication and cooling of a multi-plate clutch; these cross bores are ordinarily designed as cylindrical cross bores having a transfer radius at their outlet point. This primary shaft is also equipped with grooves for gaskets. It has been found that torque-controlling shafts of this type having cross bores and grooves, used in automatic transmissions, especially in vehicles, are susceptible to fracture under certain conditions due to a notch effect. Fractures tend to begin in the outlet area of the cross bores and grooves. Increasing the strength of these torque-controlling shafts having cross bores by improving the materials used to manufacture them, or by optimizing the tempering process, is not economically feasible due to the increased costs. Attempts have also been made to vary the positioning, the number, and the diameter of the cross bores, and to reduce the notch effect by improving surface quality. In such cases, the function of the flow of oil required for the optimal operation of the automatic transmission is often unacceptably restricted. In order to produce the necessary strength levels, the torque-controlling shafts must be strengthened in the area of the cross bores and grooves. For reasons of vibration technology, it is necessary for the torque-controlling shafts to have low torsional stiffness. But increasing strength around the cross bores and grooves substantially increases torsional stiffness. In addition, the overall diameter, and thus also the overall size of the component, are negatively affected. Furthermore, known-in-the-art torque-controlling shafts are comprised of many components, which require costly sealing methods. The main components of these torque-controlling shafts are the turbine shaft, the stator sleeve shaft, and the flange.

The object of the present invention is to disclose torque-controlling shafts that can be used in the central supply of fluid to a torque converter and to shifting elements in an automatic transmission, in which cross bores and grooves, and the related, required increases in strength, can be eliminated, thus preventing increases in torsional stiffness, and reducing the number of components required, the size of the unit, and leakage.

The object of the invention is attained with an automatic transmission of the type described, having the characterizing features of the main claim.

SUMMARY OF THE INVENTION

The present object is attained in that a reshaped turbine shaft, which has no lengthwise bore for the supply of fluid, is used in the central supply of fluid to the converter and to the shifting elements, and in that a stator shaft is used, which is equipped with a flange that is connected to the stator shaft via connecting elements, or preferably via a molding with the stator shaft. Especially advantageous are steel components that are forged or milled, as these exhibit a high level of fatigue strength. With a forged stator shaft having a solid forged flange, for example, the number of components and the overall length can be substantially reduced since the stator sleeve shaft, the fluid feed flange, and the rectangular-section ring bushing, which in the current state of the art are required, can be eliminated. An insert in the form of a reshaped metal tube that contains all the fluid channels is mounted in the stator shaft. According to the current state of the art, the fluid channels used in the stator sleeve shaft and the fluid feed flange have to be cast, at great expense. The reshaped metal tube in the invention serves as a plug-in insert, and contains gates that ensure a sealing between the fluid channels, and against the outside. The insert is preferably made of steel in order to minimize as much as possible any oil leakage that may occur with increasing temperatures. Aluminum is frequently used in components manufactured according to the state of the art, which can lead to increased leakage at the required temperature ranges, due to thermal expansion. The insert may also be reshaped, with fluid feed channels being located on the outside, thus preventing any undercutting in the cast model. The turbine shaft is designed as a solid shaft and is equipped with neither cross bores nor grooves between the teething. Furthermore, no reinforcements are necessary in the area of the cross bores and grooves. This serves to reduce the maximum shaft diameter as well as torsional stiffness.

Advantageous and practical designs of the invention are disclosed in the sub-claims. However, the invention is not limited to the combinations of characterizing features specified in the claims, but additional, sensible, possible combinations of claims and individual characterizing features will be obvious to experts in the field from the object of the invention.

BRIEF DESCRIPTION ON THE DRAWINGS

Figure 1A:
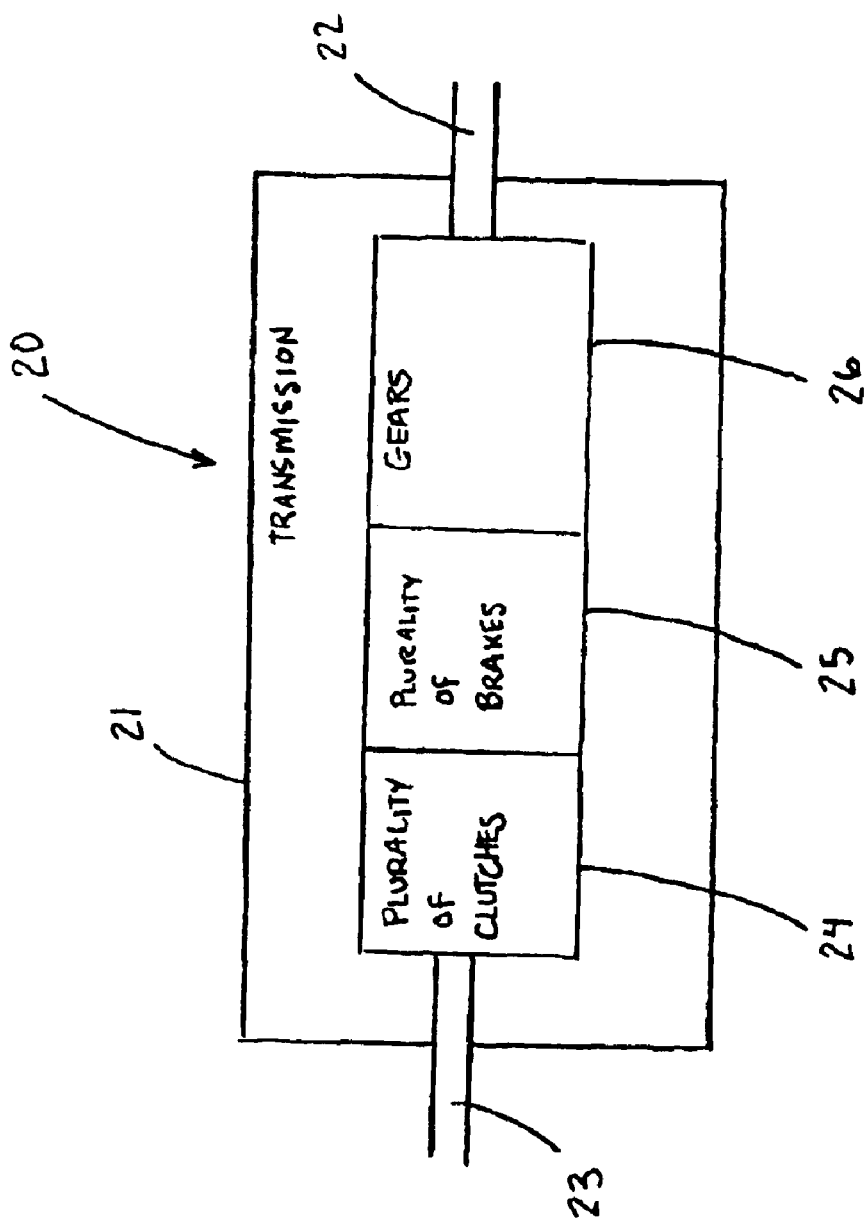

The invention will now be described, by way of example, with reference to the accompanying drawings in which:

FIG. 1 is a partial section of an embodiment of an automatic transmission as specified in the invention; FIG. 1A is a diagrammatic view showing the basic components of the automatic transmission; and FIG. 2 is a section along Line 2—2 of the automatic transmission as specified in the invention and illustrated in FIG. 1.

DETAILED DESCRIPTION OF THE INVENTION

The automatic transmission 20, illustrated in FIGS. 1 and 1A, is equipped with a torque-controlling shaft 1, hereinafter referred to as the turbine shaft, which is in a working connection with a turbine 4 and a clutch body 5 via (first and second) slaving teeth 2 and 3. The turbine shaft is designed as a solid shaft and has neither cross bores nor grooves between the slaving teeth 2 and 3. The central feed of fluid to a plurality of clutches 24 and brakes 25 of the automatic transmission is accomplished via a stator shaft 9 and an insert 6. A sealing element, which is not illustrated here, is located between the turbine 4 and the insert 6. The insert contains the fluid channels 8 and the gates 7; which ensure a sealing between the channels and against the outside. The stator shaft 9 is equipped with a flange 10; which serves as a bearing for the clutch body 5. A converter cover 11 is situated on the turbine 4. A freewheel clutch 12, a power take off 13, and a control unit 14 are connected to the stator shaft 9. The stator shaft 9 and the flange 10 are produced by reshaping. The insert 6 comprises a reshaped metal tube and is epuipped with a plurality of gates 7 which, in combination with the stator shaft 9, define a plurality of fluid channels 8. The automatic transmission 20 (FIG. 1A) also comprises a housing 21, an output shaft 22, an input shaft 23, a plurality of clutches 24, a plurality of brakes 25 and gears 26.

Figure 2:
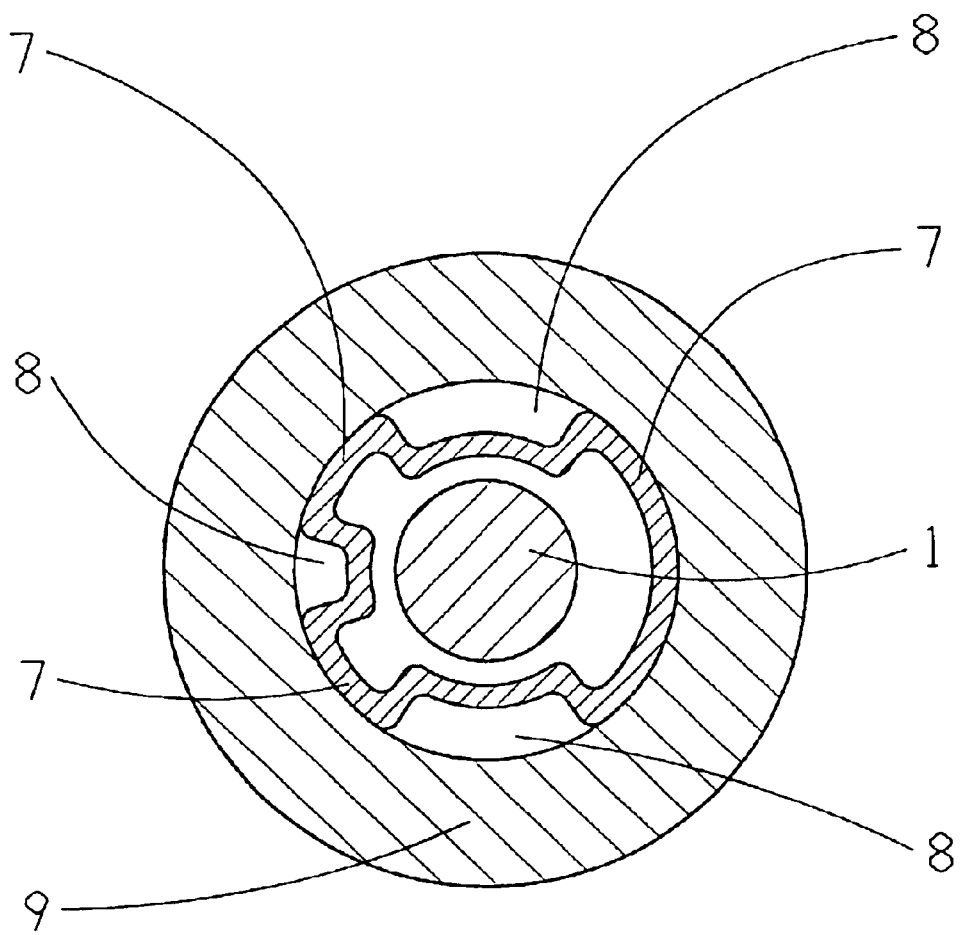

FIG. 2 shows a section along the Line 2—2, of FIG. 1, of the automatic transmission specified in the invention. The insert 6, which ensures the supply of fluid to clutches and brakes, via a special arrangement of gates 7 and fluid channels 8, is between the torque-controlling shaft 1 and the stator shaft 9.

What is claimed is:

1. An automatic transmission for a vehicle comprising a housing accommodating an input shaft, an output shaft and at least one torque-controlling shaft (1), and the automatic transmission having a plurality of clutches and brakes positioned therein for engaging a desired gear of the automatic transmission;

wherein a first end of the torque-controlling shaft (1) has a first set of teeth and a second opposed end of the torque-controlling shaft (1) has a second set of teeth, and the torque-controlling shaft (1), between the first and second sets of teeth, is a solid shaft without any cross bores and grooves and without any lengthwise bore formed therein for a central supply of fluid to desired ones of the plurality of clutches and brakes; and the central supply of fluid to the plurality of clutches and brakes is accomplished via a stator shaft (9) and an insert (6), the insert (6) and the stator shaft (9) together define and form fluid channels (8) for supplying fluid to the plurality of clutches and brakes.

2. The automatic transmission for a vehicle according to claim 1, wherein the insert (6) has at least one gate (7) which, in combination with the stator shaft (9), at least partially defines one of the fluid channels (8).

3. The automatic transmission for a vehicle according to claim 1, wherein the insert (6) has a plurality of gates (7) which, in combination with the stator shaft (9), at least partially define a plurality of fluid channels (8).

4. The automatic transmission for a vehicle according to claim 1, wherein the stator shaft (9) includes a flange (10), and the flange (10) is connected to the stator shaft (9) via one of a connecting element and formed integral therewith.

5. The automatic transmission for a vehicle according to claim 1, wherein the stator shaft (9) and the flange (10) are produced by a reshaping process.

6. The automatic transmission for a vehicle according to claim 1, wherein the insert (6) comprises a reshaped metal tube.

7. An automatic transmission for a vehicle, the automatic transmission comprising a housing accommodating an input shaft, an output shaft and at least one torque-controlling shaft (1), the automatic transmission having a plurality of clutches and brakes positioned therein for engaging a desired gear of the automatic transmission;

wherein a first end of the torque-controlling shaft (1) has a first set of teeth and a second opposed end of the torque-controlling shaft (1) has a second set of teeth, and the torque-controlling shaft (1), between the first and second sets of teeth, is a solid shalt without any cross or length wise bores or grooves therein; and an insert (6) surrounds at least a portion of the torque-controlling shaft (1) and a stator shaft (9) surrounds both the insert (6) and the torque-controlling shaft (1), and the insert (6) and the stator shaft (9) together define at least one fluid channel (8) therebetween for supplying fluid to at least one of the plurality of clutches and brakes.

8. The automatic transmission according to claim 7, wherein the insert (6) has at least one gate (7) which, in combination with the stator shaft (9), at least partially defines one of the fluid channels (8).

9. The automatic transmission according to claim 7, wherein the insert (6) has a plurality of gates (7) which, in combination with the stator shaft (9), at least partially define a plurality of fluid channels (8).

10. The automatic transmission according to claim 7, wherein the stator shaft (9) includes a flange (10), and the flange (10) is connected to the stator shaft (9) via one of a connecting element and formed integral therewith.

11. The automatic transmission according to claim 7, wherein the stator shaft (9) and the flange (10) are produced by a reshaping process.

12. The automatic transmission according to claim 7, wherein the insert (6) comprises a metal tube which is shaped to assist with partially defining at least one fluid channel (8).

13. In an automatic transmission for a vehicle comprising a housing accommodating an input shaft, an output shaft and at least one torque-controlling shaft (1), the automatic transmission having a plurality of clutches and brakes positioned therein for engaging a desired gear of the automatic transmission;

wherein a first end of the torque-controlling shaft (1) has a first set of teeth and a second opposed end of the torque-controlling shaft (1) has a second set of teeth, and the torque-controlling shaft (1), between the first and second sets of teeth, is a solid shaft without any cross or length wise bores or grooves therein;

an insert (6) surrounds at least a portion of the torque-controlling shaft (1) and a stator shaft (9) surrounds both the insert (6) and the torque-controlling shaft (1), and the insert (6) end the stator shaft (9) together define at least one fluid channel (8) therebetween for supplying fluid to at least one of the plurality of clutches and brakes; and the stator shaft (9) supports, between the first and second sets of teeth, a power takeoff (13).

* * * * *